US 7,509,415 B2

(12) United States Patent
Baekelmans et al.

(10) Patent No.: US 7,509,415 B2
(45) Date of Patent: *Mar. 24, 2009

(54) ARRANGEMENT FOR AUTOMATED FAULT DETECTION AND FAULT RESOLUTION OF A NETWORK DEVICE

(75) Inventors: John Baekelmans, Kontich (BE); Erik De Kegel, Wetteren (BE); Dean Mc Daniel, Santa Cruz, CA (US); Keith Sinclair, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 11/441,060

(22) Filed: May 26, 2006

(65) Prior Publication Data

US 2006/0277299 A1 Dec. 7, 2006

Related U.S. Application Data

(63) Continuation of application No. 10/120,401, filed on Apr. 12, 2002, now Pat. No. 7,080,141.

(51) Int. Cl.
*G06F 15/173* (2006.01)
(52) U.S. Cl. ...................... 709/224; 709/223
(58) Field of Classification Search ................. 709/224, 709/223
See application file for complete search history.

(56) References Cited

U.S. PATENT DOCUMENTS

| | | | | |
|---|---|---|---|---|
| 4,545,011 A | * | 10/1985 | Lyon et al. ...................... 714/43 |
| 5,822,534 A | * | 10/1998 | Yamunachari et al. ...... 709/224 |
| 5,995,916 A | | 11/1999 | Nixon et al. |
| 6,006,016 A | * | 12/1999 | Faigon et al. .................. 714/48 |
| 6,175,934 B1 | | 1/2001 | Hershey et al. |
| 6,199,018 B1 | | 3/2001 | Quist et al. |
| 6,324,659 B1 | | 11/2001 | Pierro |
| 6,529,784 B1 | * | 3/2003 | Cantos et al. ................. 700/79 |
| 6,654,801 B2 | | 11/2003 | Mann et al. |
| 6,725,281 B1 | * | 4/2004 | Zintel et al. ................. 719/318 |
| 6,883,120 B1 | | 4/2005 | Banga |
| 7,000,247 B2 | * | 2/2006 | Banzhof ........................ 726/2 |
| 2001/0051890 A1 | | 12/2001 | Burgess |
| 2002/0087882 A1 | * | 7/2002 | Schneier et al. ............. 713/201 |
| 2002/0093525 A1 | * | 7/2002 | Asauchi ....................... 345/714 |
| 2003/0014481 A1 | | 1/2003 | Tsuge et al. |
| 2003/0055931 A1 | * | 3/2003 | Cravo De Almeida et al. .......................... 709/223 |

* cited by examiner

*Primary Examiner*—John Follansbee
*Assistant Examiner*—Ranodhi N Serrao
(74) *Attorney, Agent, or Firm*—Leon R. Turkevich

(57) ABSTRACT

A network based management system enables network devices installed at a customer's premises to be automatically monitored and managed for automated support services. Each network device includes a monitoring agent configured for generating a notification message based upon an event where device operations exceed prescribed monitored parameters. A troubleshooting resource at the customer premises requests selected device state attributes from the network device and that are forwarded to a data collection resource that serves as an interface to the manufacturer's back-end infrastructure. The troubleshooting system accesses databases that store the configuration information for the affected network device, and uses the configuration information for accessing problem/resolution information. The rules based troubleshooting system, upon correlating the databases for the problem/resolution information, provides a service notification message as a response to the event, and selectively includes the problem/resolution information for the network device.

23 Claims, 5 Drawing Sheets

ARRANGEMENT FOR AUTOMATED FAULT DETECTION AND FAULT RESOLUTION OF A NETWORK DEVICE

This application is a continuation of commonly-assigned, application Ser. No. 10/120,401, filed Apr. 12, 2002, issued as U.S. Pat. No. 7,080,141 on Jul. 18, 2006.

BACKGROUND OF THE INVENTION

1. Field of the Invention

The present invention relates to network management systems, including systems used for systems monitoring, fault detection, troubleshooting, fault resolution, and systems maintenance.

2. Description of the Related Art

Existing network management and maintenance technology typically requires manual intervention when a network device encounters a failure. A network manager, upon isolating the network device having the problem, typically will need to perform a swap of hardware components, or attempt to load updated software in order to attempt to resolve the problem. Almost invariably, however, a network manger will need to obtain additional technical information for managing or troubleshooting the network device. For example, the network manager may need to access a technical support web page offered by the manufacturers of the network device in order to determine whether "help pages" provide adequate troubleshooting suggestions or failure solutions.

However, as networks and information technology in general become more complex to service and support, the use of a web page based source for troubleshooting information becomes less effective. In particular a human-web page interface often is inefficient for the network manager, since the network manager often may be required to manually supply device type, serial number, software versions, and a brief statement of the problem in order to provide sufficient search parameters for the web page to generate a query in the back-end databases supported by the vendor. Unfortunately, such a query fails to take into consideration more complex interactions that may affect the performance of the network device, including network topology, device configurations, and dynamic parameters that affect the network device performance.

In particular, complex networks are composed of multiple network devices that interact between each other. Moreover, network managers of large networks encounter considerable difficulty in maintaining an accurate inventory of all devices in the network and their respective configurations, including features such as SNMP configuration. Existing network discovery resources, for example ping sweep resources used to locate IP addresses of SNMP-enabled network devices, are inadequate to provide a comprehensive inventory of the network, since even with existing intelligent device searches, it is almost impossible to maintain an adequate overview of the network to a reasonable, updated status.

Another fundamental problem associated with management of complex networks involves providing hardware or software updates to the network devices as the updates are developed by the device manufacturers. Although client side resources (i.e., resources executed on a client device) exist that enable a personal computer to search via the Internet for updated revisions for installed software applications, such an arrangement is impractical for network devices such as switches, routers, gateways, etc., that may be installed in a complex network.

Similar problems exist when a network manager may wish to monitor the operational status of a network device: monitoring the operational status of a network device requires adequate configuration of the management features within the device, and of the management station collecting the management data. Highly skilled and trained staff are then required to analyze the feedback from the management system, and to maintain the management system. Network managers, upon obtaining data that describes the operational status of a network device, are left with the same problem of how to interpret the data describing the device status, in the context of the device operations within the network, and relative to other similar devices having the same configuration and networks having similar network topologies. Moreover, attempts to contact technical support representatives at a network device manufacturer also may provide limited results, since the technical support personnel do not know exactly what hardware or software features are installed in the customer's network, often causing technical support personnel to suspect that the problem may exist in other devices installed on the network.

Finally, existing network management technology is unable to preempt a network device failure. For example, if a network device runs low on system resources, typically the reduction in system resources will not be detected with sufficient time to take preventive action, rather, it probably will only be detected once the network device has failed. Hence, the users of the network having the failed device are unnecessarily burdened with loss of network service.

SUMMARY OF THE INVENTION

There is a need for an arrangement that provides a predictive, reactive and proactive network service that enables network devices to be managed with minimal loss of service.

There also is a need for an arrangement that enables network device operation to be automatically monitored, where problems associated with the networks device can be anticipated and resolved before encountering a failure in the network device.

There also is a need for an arrangement that enables updated information associated with a network device, including update notices, critical service bulletins, etc. to be automatically delivered to a network to enable the network manager to proactively implement the corrective measures before encountering a failure in the network devices installed in his or her network.

These and other needs are attained by the present invention, where a network based management system enables network devices installed at a customer's premises to be automatically monitored and managed for automated support services, based on coordinated information transfer between monitoring agents and troubleshooting resources at the customer premises, and centralized troubleshooting systems and databases in the device manufacturer's network infrastructure. Each network device utilizing the automated management and support includes a monitoring agent configured for monitoring device operations, and generating a notification message based upon an event where the device operations exceed prescribed monitored parameters. A troubleshooting resource, resident at the customer premises, is configured for requesting selected device state attributes associated with the events from the network device based on reception of the notification message. The selected device state attributes are forwarded to a data collection resource that serves as an interface to the manufacturer's back-end infrastructure, including the rules based troubleshooting system and associated databases. The troubleshooting system accesses databases that store the configuration information for the affected network device, in order to precisely identify the configuration for the affected network device, and uses the configuration information for accessing problem/resolution information in a database based on rules that define how correlation of the database information is to be performed based on the configuration information for the network device, and the selected device state attributes associated with the event in the network device. The rules based troubleshooting system, upon correlating the databases for the problem/resolution information, provides a service notification message as a response to the event, and selectively includes the problem/resolution information for the network device, enabling a network manager to respond to the event by utilizing the supplied problem/resolution information.

Hence, the supply of selected device state attributes associated with the network event to the rules based troubleshooting system, and the storage of the configuration information for the network device in a database accessible by the troubleshooting, enables the troubleshooting system to precisely identify problem/resolution information, based on the configuration information specifying the precise configuration options (e.g., device model, serial number, hardware and software updates, network topology and configuration, etc.). In addition, more precise problem/resolution information can be added to the databases as additional engineering knowledge is developed for servicing and support of the network devices, along with additional rules that enable the rules based troubleshooting system to determine the optimum problem/resolution information for the network device given its current configurations and current device state attributes.

Hence, the network based management system provides an arrangement that enables network devices to be automatically monitored and managed to predict problems before they occur, react to detected events within the network device, and provide proactive activities based on updated engineering information added to the databases.

One aspect of the present invention provides a system. The system includes a network device, a troubleshooting resource, at least one data collection resource, a first database, a second database, and a rules-based troubleshooting system. The network device has an identifiable configuration and includes a monitoring agent configured for monitoring device operations relative to monitored parameters, and for generating a notification message based on an event where the device operations exceed at least one of the monitored parameters. The troubleshooting resource is configured for requesting selected device state attributes associated with the event from the network device based on reception of the notification message. The data collection resource is configured for collecting the selected device state attributes associated with the event into an event message, and is configured for collecting the selected device state attributes for events from a respective plurality of the troubleshooting resources via respective secure connections via an Internet Protocol (IP) network. The first database is configured for storing the identifiable configuration information for the network device, and the second database is configured for storing problem/resolution information for the network device according to known configurations. The rules-based troubleshooting system is configured for determining a presence in the second database of problem/resolution information for the network device based on correlating the identifiable configuration information retrieved from the first database and the corresponding selected device state attributes specified in the event message. The rules-based troubleshooting system also is configured for providing a service notification message as a response to the event and that selectively includes the problem/resolution information for the network device.

Another aspect of the present invention provides a method of managing a network device. The method includes storing identifiable configuration information for the network device in a first database configured for storing the identifiable configuration information for multiple network devices, generating, in the network device, a notification message based on an event where device operations monitored by a monitoring agent exceed at least one of a plurality of monitored parameters, and requesting, by a troubleshooting resource, selected device state attributes associated with the event from the device based on reception of the notification message. The selected device state attributes associated with the event are collected from the troubleshooting resource by a data collection resource via a secure connection via an Internet Protocol (IP) network, and the data collection resource outputs an event message that includes the selected device state attributes to a rules-based troubleshooting system. The method also includes determining, by the rules-based troubleshooting system, a presence in a second database of problem/resolution information for the device based on correlating the identifiable configuration information retrieved from the first database and the corresponding selected device state attributes specified in the event message. The second database is configured for storing problem/resolution information for the network devices according to respective known configurations. The method also includes providing, by the rules-based troubleshooting system, a service notification message as a response to the event and that selectively includes the problem/resolution information for the device.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, where elements having the same reference numeral designations indicate like elements throughout and wherein.

BEST MODE FOR CARRYING OUT THE INVENTION

Figure 1:
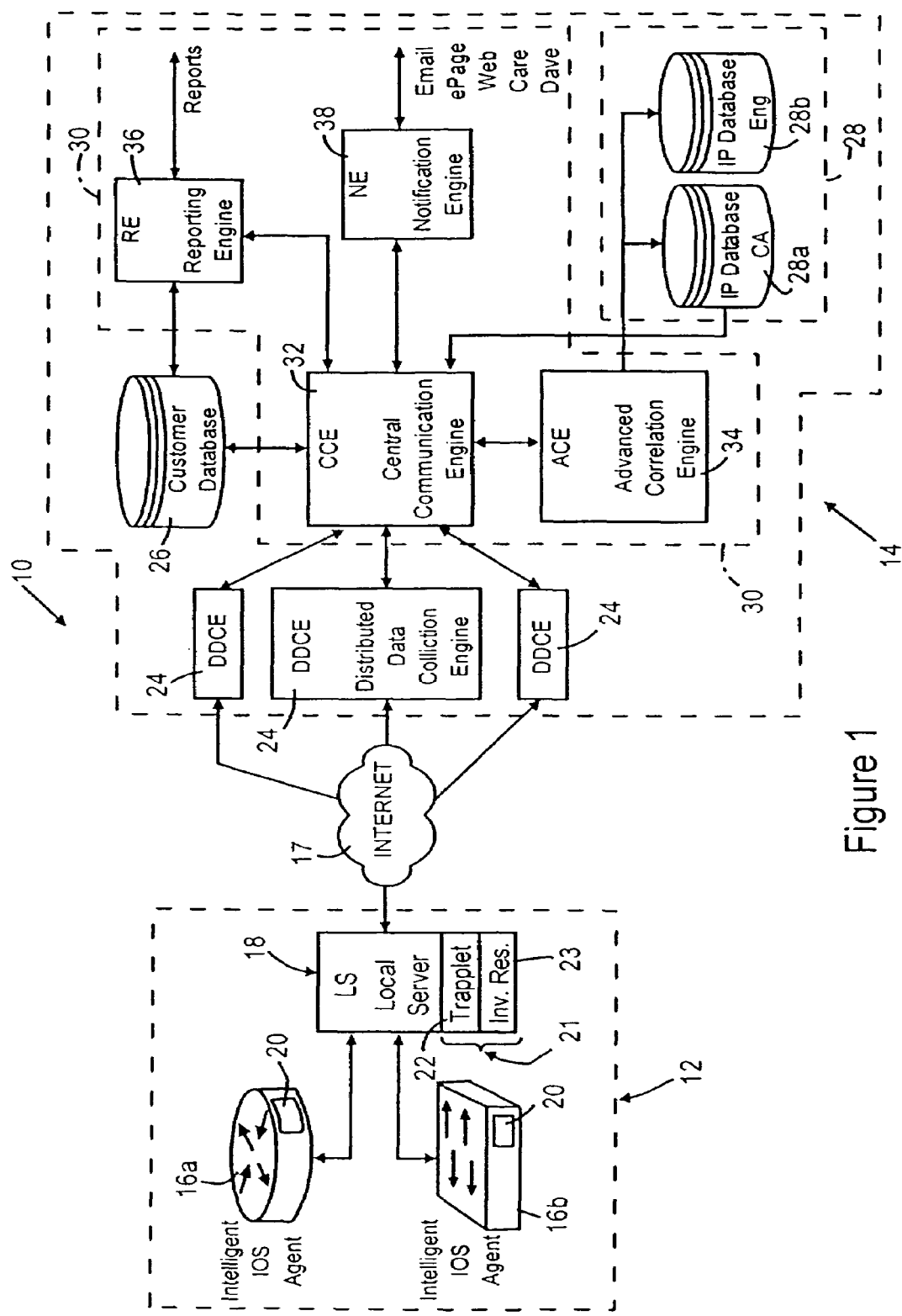
FIG. 1 is a diagram illustrating the system for automated fault detection and fault resolution of a network device, according to an embodiment of the present invention.

FIG. 1 is a block diagram illustrating a system 10 for providing automated fault detection and fault resolution in a network, according to an embodiment of the present invention. The system 10 provides automated support services, including predictive health monitoring of network devices, proactive notifications of updated resources and troubleshooting techniques, and automated fault detection and resolution based on detected network device conditions. The system 10 provides automated support services based on coordinated information transfer between customer premises based resources 12, and centralized support resources 14 implemented for example within the device manufacturer's network infrastructure. The information transfer between the customer premises based resources 12 and the centralized support resources 14 is implemented via secure connections via an Internet Protocol (IP) network 17, for example the Internet. Hence, the integration of device and infrastructure information from the customer premises based resources 12 with the centralized troubleshooting systems and engineering databases in the centralized support resources 14 enable the implementation of automated fault detection and fault resolution for a network device, as well as predictive health monitoring, and proactive notifications for improved reliability with reduced requirements for a network manager.

The customer premises based resources 12 generally are configured for registering all network devices deployed within the customer premises network and collecting the configuration information (e.g., inventory, hardware/software configuration, network topology, etc.), for storage in the databases within the centralized support resources 14. The customer premises based resources 12 also are configured for monitoring selected device parameters to determine whether device resources in a network device are reaching a depleted state, and respond to all alerts sent out by any of the registered network devices. The information is collected in a standardized manner, and forwarded via a secure connection to the centralized support resources 14 for analysis. The customer premises based resources 12 also are configured for maintaining software installed in the network devices, enabling the update of software as it becomes available from the centralized support resources 14.

The centralized support resources 14 generally are configured for accepting the information from the customer premises based resources 12 via the IP network 17, and storing inventory data and enabling automatic reporting regarding the installed base of network devices. Database resources can be configured for periodically compiling reports regarding the installed base of network devices for statistical analysis for reliability assessment, quality control, defect monitoring, etc. The centralized support resources 14 also are generally configured for automatically correlating troubleshooting information in terms of problems/resolution pairs stored in internal databases, and automatically sending correlation results to designated recipients, for example network managers and designated product support engineers for the device manufacturer.

In addition, the storage of updated problem/resolution information in the databases of the centralized support resources 14 enable resolution of prior known problems with existing network devices; hence, update resources may correlate the updated problem/resolution information to notify network managers of new troubleshooting techniques, proposed solutions, or new software revisions that may be relevant to known problems. In addition, the centralized support resources 14 can generally be configured for monitoring the deployment and configuration of a network device, and utilize a best practices resource in order to inform network managers of suggested improvements in deployment, optimizing network device efficiency and reducing possible device failures.

The customer premises based resources 12 include network devices 16, for example network routers that have a identifiable configuration, and a local server 18. Each network device 16 that is configured for automated management includes a monitoring agent 20, implemented for example as a software management resource residing within the internal operating system (IOS) of the network device 16. The monitoring agent 20, also referred to as a fault manager is configured for "auto-announcing", where upon initialization of the device 16, the monitoring agent 20 supplies the identifiable configuration information to the local server 18, for delivery of the configuration information and relevant topology information to databases in the centralized resources. The monitoring agent 20 also outputs a notification message in response to any hardware change or any software configuration change, enabling the databases in the centralized support resources 14 to retain updated information with respect to the configuration of the corresponding device 16. As described in further detail below, the monitoring agent 20 also is configured for monitoring device operations relative to monitored parameters, for example CPU utilization, and memory usage (e.g. percent of free memory available) that may indicate a depletion of system resources, plus an electronic crash ("e-crash") notifier to notify the local server 18 in the event that the corresponding device 16 is about to encounter a system failure.

The local server 18, also referred to as a service appliance, includes data gathering resources 21 including a troubleshooting resource 22 and an inventory resource 23. Each of the resources 22 and 23 are implemented for example as a collection of text files having XML-based operation commands configured for specifying application operations, and XML-based logic commands for specifying application logic according to the corresponding application. For example, the troubleshooting resource 22 includes text files including XML-based operation commands configured for specifying data-gathering operations for troubleshooting applications, and XML-based logic commands for specifying troubleshooting application logic; the inventory resource 23 includes text files including XML-based operation commands configured for specifying data-gathering operations for inventory applications, and XML-based logic commands for specifying inventory application logic.

The data gathering resources 21 are executed by executable software resources having XML parsing capabilities. For example, the software resources configured for executing the XML-based commands of the troubleshooting resource 22 or the inventory resource 23 may include, for example, a Telnet resource, an SNMP resource, an SSH resource, etc. Hence, the troubleshooting resource 22 and the inventory resource 23 provide data-gathering capabilities to respond to messages from the network device 16 according to the appropriate transport service (e.g., Telnet, SNMP, SSH, etc.). Note that the data gathering resources 21 could alternately be implemented as java applets.

The troubleshooting resource 22, also referred to as a "trapplet", is configured for responding to notification messages from the monitoring agents 20 by requesting relevant device information depending on the notification received from the corresponding agent 20. For example, the trapplet 22 in response to detecting a notification message indicating a depletion of resources relevant to prescribed monitored parameters, fetches from the corresponding device 16 (e.g., 16*a* or 16*b*) a listing of all processes currently being executed by the internal processor 16. The trapplet 22, upon collecting the trapplet data from the corresponding device 16 using for example an SNMP client resource, initiates a secure connection via the IP network 17 for transfer to a data collection resource 24.

The centralized support resources 14 include a plurality of data collection resources 24, also referred to as distributed data collection engines (DDCE), configured for collecting the selected device attributes from the trapplet 22 and forming an event message for delivery within the back-end infrastructure of the centralized support resources 14. Typically the system 10 will include multiple data collection resources 24 that are geographically dispersed, enabling each data collection resource 24 to receive the selected device state attributes from a corresponding group of customer premises based resources 12 within a corresponding geographic region. Hence, the distributed data collection resources 24 can collect device information from customers worldwide for centralizing processing and analysis by the centralized support resources 14. To optimize security, at least one firewall server may be deployed between each DDCE 24 and the IP network 17, at least one firewall server between each local server 18 and the IP network 17, and at least one firewall server between each DDCE 24 and the centralized support resources 14.

As illustrated in FIG. 1, the centralized support resources 14 include a customer network database 26, a troubleshooting database system 28, and a rules based troubleshooting system 30. The customer network database 26 is configured for storing information for each installed network device 16, including device model number, serial number, service or sales contract number, and configuration information including hardware configuration, software configuration, software resource versions, customer identifier, network topology information, and solved and unsolved problems. As described below, the customer database 26 is populated based on the configuration information supplied by the corresponding monitoring agents 20, enabling an engineer (or any software-based troubleshooting resource) accessing the centralized support resources 14 to precisely identify the configuration and operational performance of each network device 16.

The troubleshooting database system 28 includes a customer assistance database 28a, and an engineering database 28b, each of which are configured for storing relevant problem/resolution information for each installed device 16 according to each known configuration. As described below, the information is stored in the databases using a standardized schema according to extensible markup language (XML) based definitions, enabling detailed correlation of the troubleshooting database system 28 based on device type, device configuration, applied network topology, known "symptoms" based on supplied device state attributes associated with a notification event from the network, etc.

The rules based troubleshooting system 30 is configured for receiving the event messages from the data collection resources 24, and correlating the troubleshooting database system 28 for problem/resolution information based on correlating the identified configuration information for a device, retrieved from the customer database 26, with the selected device state attribute specified in the supplied event message. As described below, the rules based troubleshooting system 30 applies a rules based correlation methodology based on prescribed network infrastructure rules and network element rules defined according to a prescribed extensible markup language such as XML.

Figure 2:
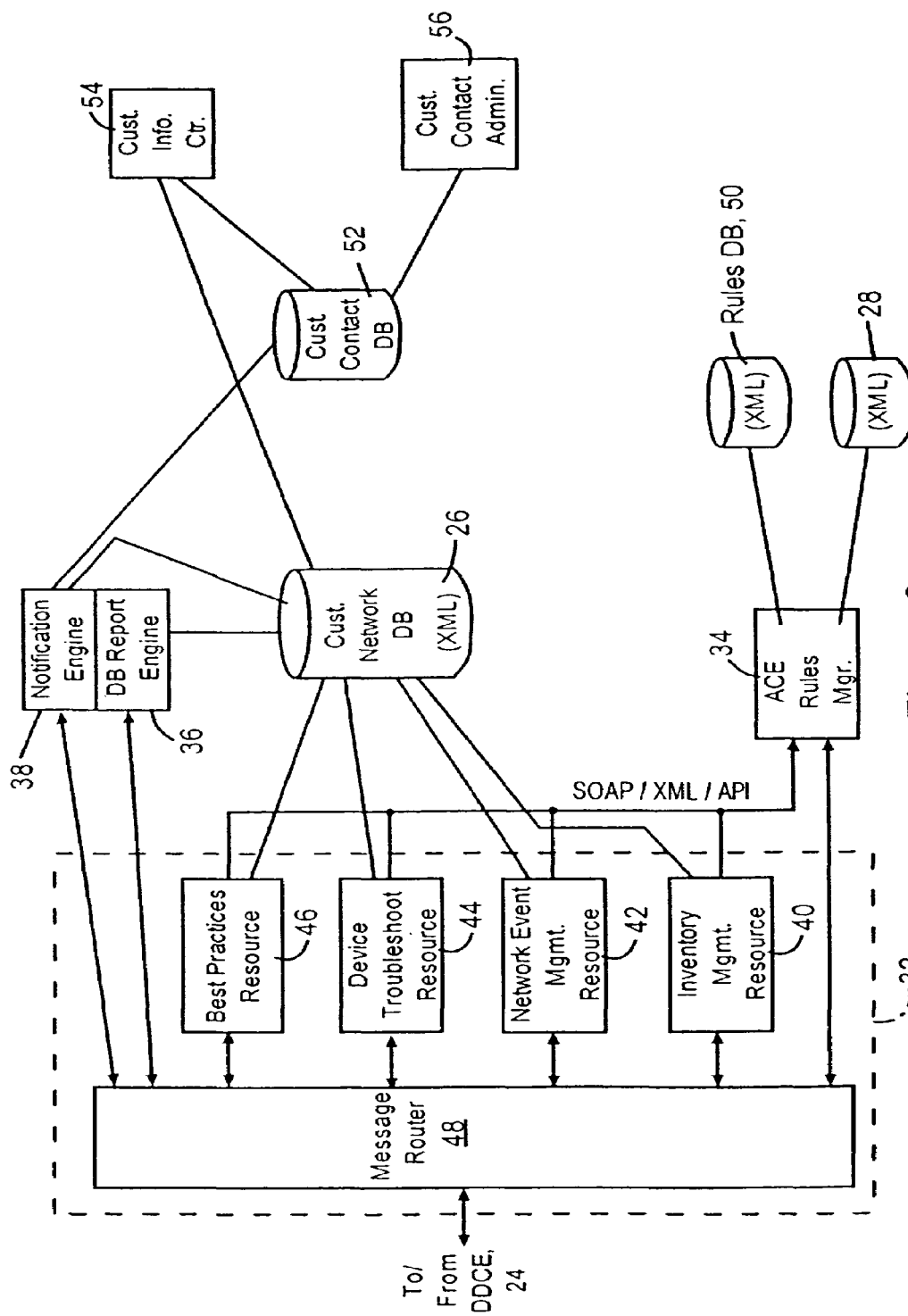
FIG. 2 is a diagram illustrating in further detail the centralized support resources of FIG. 1.

The rules based troubleshooting system 30 includes a central communications engine (CCE) 32, a rules manager 34, also referred to as an advanced correlation engine (ACE) 34, a reporting engine (RE) 36, and a notification engine (NE) 38. The central communication system 32, described in further detail with respect to FIG. 2, is configured for routing information between the distributed data collection resources 24, the databases 26 and 28, and the engines 34, 36, and 38. In particular, the central communications engine 32 includes resources for initiating procedures based on the data received from the distributed data collection resources 24, enabling the integration of the databases 26 and 28 with the different engines 34, 36, 38, and integration of the data supplied to and from the trapplets 22 by the respective data collection resources 24.

FIG. 2 is a block diagram illustrating in further detail the centralized support resources 14 according to an embodiment of the present invention. The central communications system 32 includes an inventory management resource 40, a network events management resource 42, a device troubleshooting resource 44, a best practices module 46, and a message router 48.

The message router 48, implemented for example using the commercially available Tibco and MessageBroker™ from Tibco Software, Inc., Palo Alto, Calif., integrates the operations between the executable application resources 34, 36, 38, 40, 42, 44, and 46 and the databases 26, 28, 50, and the distributed data collection engine 24. In particular, the message router 48 passes messages received from the data collection engine 24 to the appropriate application resource (e.g., inventory management resource 40, network events resource 42, device troubleshooting resource 44, or best practices resource 46) based on the received message type, typically implemented in the form of an XML tag within the message that specifies the nature of the message. The message router 48 also is configured for establishing a secure connection with each DDCE 24, effectively extending the structure of the CCE 32 to the DDCE 24.

The message router 48 also provide two-way transactions, in that messages generated in the centralized support resources 14 and destined for a trapplet 22 at the customer premises based resources 12 are forwarded by the message router 48 back to the corresponding DDCE 24 for delivery to the trapplet 22; depending on implementation, the message router 48 also may pass messages generated by the notification resource 38 (e.g., SNMP notification messages to the assigned network manager via the Internet 17).

Each of the resources within the central communications engine 32 is configured for performing a prescribed application operation associated with network management; hence, the message router 48 upon receiving a message from the DDCE 24, forwards the message to the appropriate resource for execution.

For example, the inventory management resource 40 is configured for loading configuration information into the customer database 26. In particular, the message router 48 forwards inventory information received from an inventory resource 23 to the inventory management application 40; the inventory information, which may include new configuration information for a newly initialized device 16, or updated configuration information in response to a hardware or software modification to the device 16, is parsed by the inventory management application 40 for updating of the appropriate records within the customer database 26.

The customer database 26 is configured for storing information including customer ID, device ID, detailed device hardware information, device software versions, a listing of enabled device software features, IP address, user name and passwords, topology structure, and geographical location. The information stored in the customer database 26 is organized using a structured definition language, for example network definition language based upon XML tags that enables topology structures to be described using text based tags, enabling the reconstruction of a model that precisely describes a customer's network topology from the customer database 26.

The customer database 26 also is configured for storing data associated with detected network events, including prescribed states or state transactions that may be associated with a given network device 16. In particular, the network events management resource 42 is configured for storing, within the customer database 26, network event related information associated with a corresponding specified network device 16 based on reception of a network event message from the message router 48. Hence, a trapplet 22, upon detecting a prescribed network event that affects a network device 16, may retrieve the associated device status associated with the network event (e.g., a congestion condition, interruption of a media stream, etc.) and forward the network event related information and the relevant device state attributes to the DDCE 24 for storage by the network events management resource 42 via the message router 48.

The device troubleshooting resource 44 is configured for predictive health monitoring based on receiving from the DDCE 24 an event message that specifies selected device state attributes based on the monitoring agent 20 detecting an event where device operations exceed selected monitored parameters. As described below with respect to FIG. 4, the device troubleshooting resource 44 is configured for utilizing the rules manager 34 in order to identify a problem/resolution entry within the databases 28 based on the selected device state attributes specified in the event message, and the configuration information retrieved from the customer network database 26 for the affected device 16.

The best practices application resource 46 is configured for identifying optimum device configuration settings, for example in response to receiving a copy of the identifiable configuration information sent by the trapplet 22 during initialization or hardware/software changes in the network device 16.

Note that the device troubleshooting resource 44 and the best practices resource 46, upon identifying a proposed/actual solution for the device 16, may, depending on implementation, either output the correlation results to the notification resource 38 for delivery to a network manager, and/or send the correlation results back to the trapplet 22 via the corresponding DDCE 24 for automated implementation to resolve the problem in the network device 16.

The reporting engine 36 is configured for performing ad-hoc queries on the customer database 26 by engineering personnel at the centralized support resources, or by privileged users having direct access to the customer database 26. The database reporting resource 36 also is configured for performing periodic (e.g., daily) customer database queries, and linking the correlation results back to existing data structures within the centralized support resources 14, for example for inventory management or collection of statistical information for different installed devices, etc. In addition, the database reporting engine 36 can be used for performing audits of existing data within the customer database 26, independent of performance related issues.

The database reporting engine 36 also is configured for serving as a device update resource configured for identifying, based on new problem/resolution information added to the databases 28 by technical support engineers, network devices that may be affected by the new problem/resolution information. In particular, the database reporting engine 36 can correlate the new problem/resolution information to the configuration information stored in the customer database 26, and output to the notification engine 38 and update notification for the network devices affected by the new problem/resolution information.

The notification engine 38 is configured for sending notifications as needed following correlation of information within the databases 26 and/or 28 by the correlation engine 34, or the reporting engine 36. Notifications may be sent via email, epage, transmission of a webpage, etc.

The centralized support resources 14 also include a customer contact database 52 configured for storing entries specifying, for each network device, the corresponding manager contact for the network device. Hence, any problem or update associated with a given network device (e.g., 16*a*) can be sent to an identified manager contact for the network device 16*a* based on retrieval of the corresponding contact information from the contact database 52 by the notification engine 38. The resources 14 also include a customer information center interface 54, enabling support representatives to issue queries and view the problem/solution information for customers, and a customer contact administrator interface 56, enabling an administrator to locate contact information for a customer.

Figure 3:
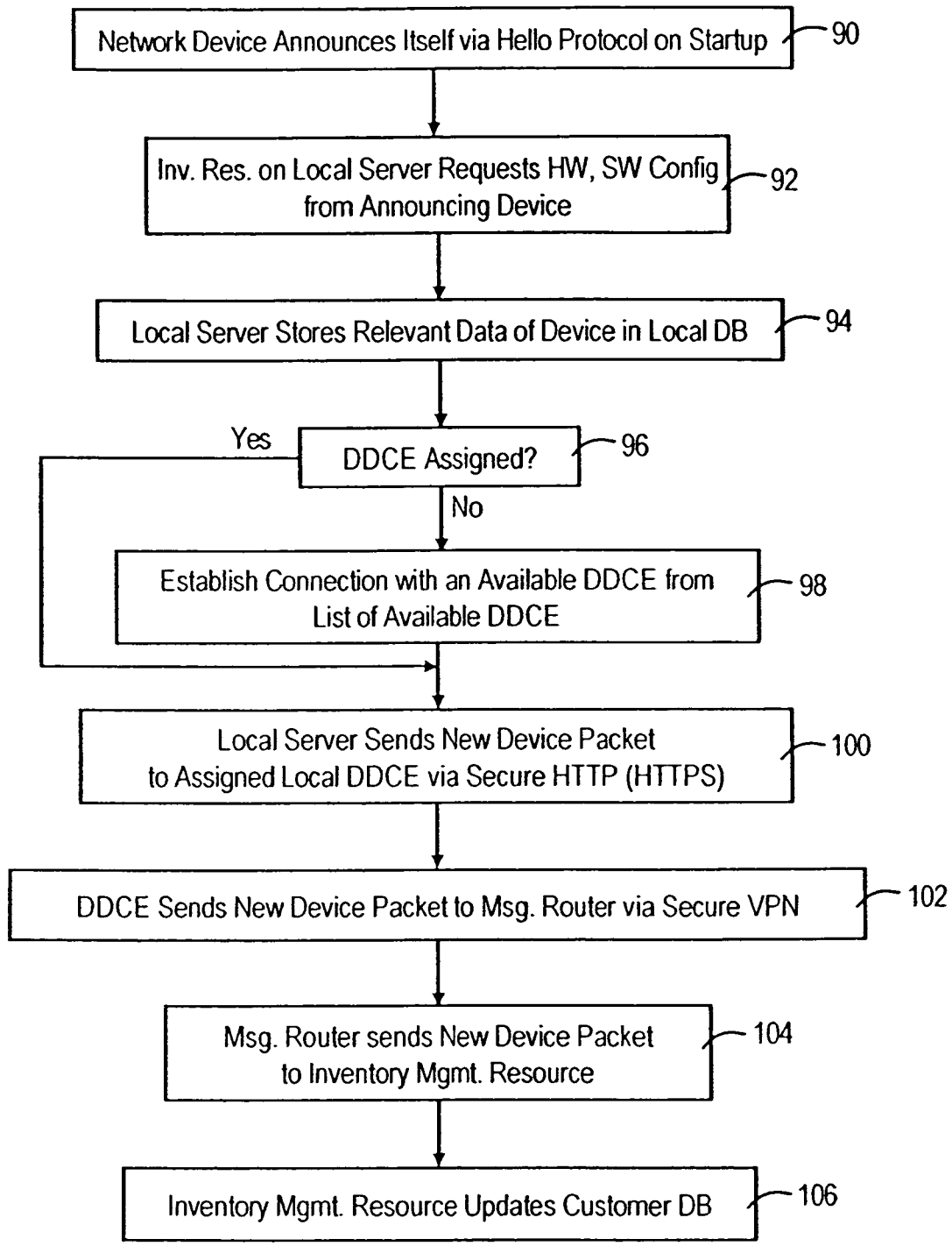
FIG. 3 is a flow illustrating auto-announcement by the network device of FIG. 1 for storage of configuration information in a centralized database, according to an embodiment of the present invention.

FIG. 3 is a diagram summarizing the method of performing auto-announcement by a network device for populating the customer database 26, according to an embodiment of the present invention. Note that the steps described herein with respect to FIGS. 3, 4, and 5 can be implemented as executable code stored on a computer readable medium (e.g., a hard disk drive, a floppy drive, a random access memory, a read only memory, an EPROM, a compact, etc.).

The method begins in step 90, where the network device 16 announces itself on startup using a prescribed announcement protocol (e.g., a "hello protocol"). The local server 18, in response to detecting the auto announcement by the monitoring agent 20 in the network device 16, references the inventory resource 23, causing the inventory resource 23 in step 92 to request hardware and software configuration information from the announcing device 16.

The inventory resource 23 of the local server 18 stores in step 94 the relevant configuration information received from the device 16 in the local database of the local server 18 (not shown), and prepares to forward the configuration information to a locally assigned DDCE 24. In particular, if in step 96 no DDCE 24 is assigned to the local server 18, for example due to an installation of a new network at the customer premises based resources, the inventory resource 23 establishes in step 98 a connection with an available DDCE 24 via the Internet 17, using a prestored list of available DDCE devices 24. The inventory resource 23 in the local server sends in step 100 a new device packet containing the hardware/software configuration for the announcing device 16 to the assigned local DDCE 24 via a secure HTTP connection.

The DDCE 24, upon receiving the new device packet from the inventory resource 23, sends in step 102 the new device packet to the message router 48 via a secure connection extending from the message router 48. The message router 48, upon parsing the message to determine the message type, sends in step 104 the new device packet to the inventory management resource 40. The inventory management resource 40 updates in step 106 the customer database 26 including the relevant customer and device information, including: customer ID, device ID, detailed device hardware information, device software versions, a listing of enabled software features, IP address, user names/passwords, topology structure, geographical location, etc. As described above, the inventory management resource 40 stores the information using a prescribed network definition language format based upon an XML language paradigm, enabling the recovery of topology information from the text-based information stored in the customer database 26.

Once the customer database 26 has been populated with the device information, predictive health monitoring and automatic troubleshooting can be performed for the device.

Figure 4:
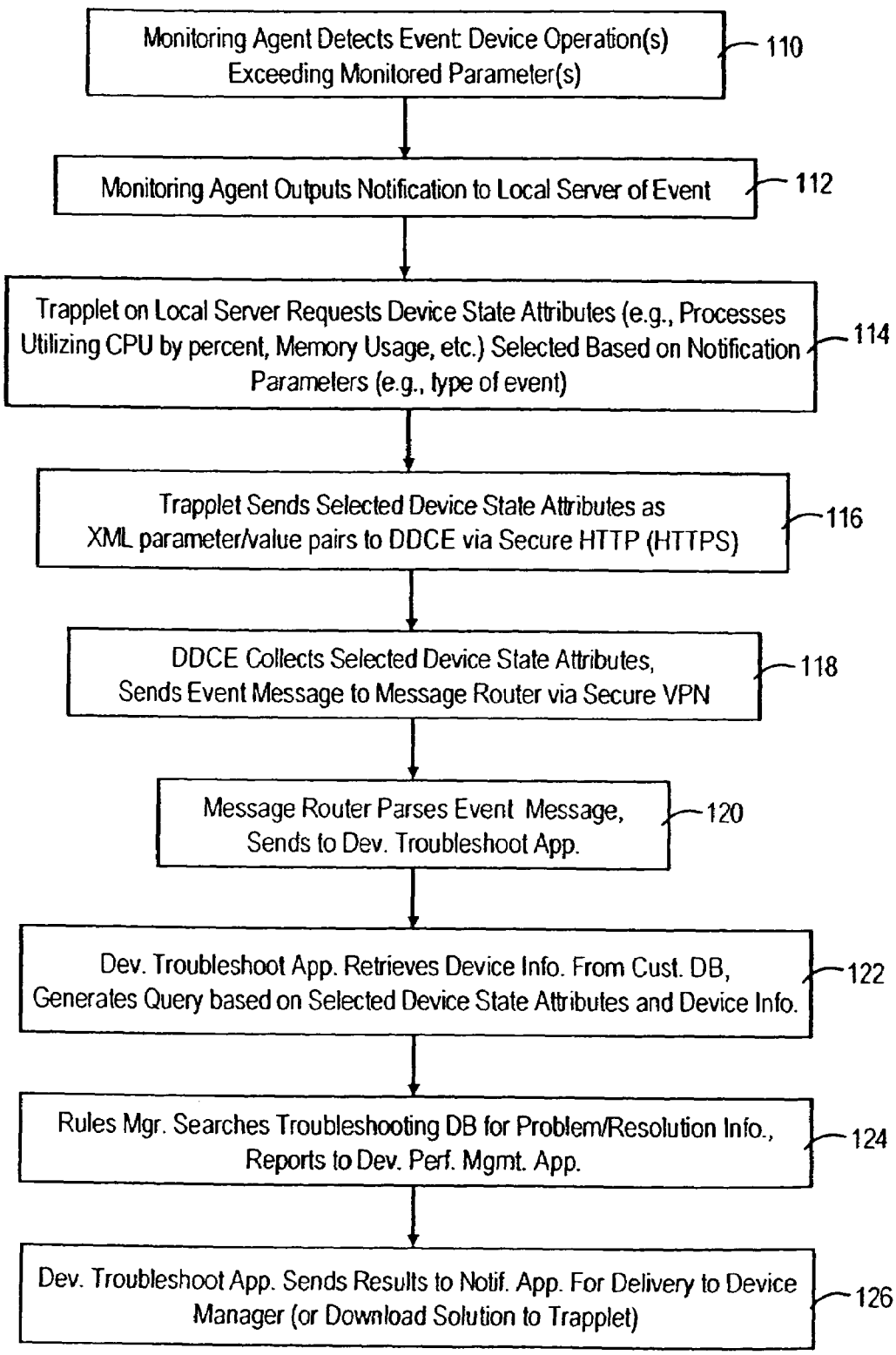
FIG. 4 is a diagram illustrating predictive health monitoring operations for a network device by the system of FIG. 1, according to an embodiment of the present invention.

FIG. 4 is a flow diagram illustrating the method for predictive health monitoring according to an embodiment of the present invention. The predictive monitoring begins based on the monitoring agent 20 detecting in step 110 a device event based on measured device operations exceeding prescribed monitored parameters, for example CPU utilization, memory usage such as available random access memory, or stored disk space, etc. The monitoring agent 20 outputs in step 112 a notification to the local server 18 based on the event. The trapplet 22 executing on the local server 18 responds to the notification by requesting device state attributes in step 144, for example a listing of the processes used utilizing the CPU and the respective percent utilization of CPU capacity, memory resource utiliziation for each process, etc. The trapplet 22 is configured for requesting selected device state attributes based on, for example, notification parameters, for example the type of event having caused the notification by the monitoring resource 20.

The trapplet 22, in response to retrieval of the selected device state attributes, sends the selected device state attributes as XML parameter/value pairs to a DDCE 24 via a secure HTTP connection in step 116.

The DDCE 24 collects the selected device state attributes, and sends in step 118 an event message to the messaging router 48 via a secure connection extending from the message router 48. The message router 48 parses the event message in step 120 to determine the message type, and sends the event message to the device troubleshooting application 44.

The device troubleshooting application 44, in response to the event message, retrieves in step 122 the device information for the device identified in the event message from the customer database in step 122, and generates a query based on the selected device state attributes and device information for the rules manager 34.

The rules manager 34 correlates the troubleshooting databases 28a and 28b in step 124 for problem/resolution information based on the supplied device information, the supplied device state attributes associated with the events, and based on network management rules stored in the rules database 50. In particular, the rules database 50 includes XML-based network management rules to provide a structured methodology for correlating the databases 28. For example, the network management rules include network infrastructure rules for describing a network infrastructure, and network element rules for describing network elements such as the network device. The network management rules also will include network event rules for describing network events that may arrive. An example of XML based network management rules involve relying on document type definitions as specified by the XML transmission network definition (W3C note 21, Nov. 2000) published by the World Wide Web Consortium, available on the World Wide Web at www.w3.org/TR/xtnd.

Hence, the rules manager 34 is configured for receiving data (e.g., received troubleshooting data), and correlating the received real-time data to known rules and stored data. In particular, the rules specify prescribed parameters and values that are used to determine rules-based decisions. Hence, the rules map to the stored data, and the received real-time data (received from the DDCE 24) is applied to the rules in order to follow a path of rules-based decisions (e.g., an XML-based rules decision tree) to locate the most appropriate data in the databases. Hence, the correlation performed by the rules manager 34 is distinguishable from prior SQL based search queries that attempt to locate an entry based on simply matching a supplied key-value pair.

Once the rules manager 34 has correlated the troubleshooting databases 28 based on the rules-based correlation according to based on the device information and the supplied device state attributes associated with the events, the rules manager 34 sends the results back to the device troubleshooting resource 44. The device troubleshooting resource 44 sends in step 126 the results of the correlation to the notification application 38 for delivery to the device manager specified in the customer contact database 52. Alternately, the notification resource 38 may cause an executable resource to be downloaded to the trapplet 22 for automatic execution of a solution for the detected event.

Hence, the integration of device specific information for a given network device (e.g., a router 16a) stored in the customer database 26, correlated with event specific information supplied by a trapplet 22 in response to occurrence of the event, enables the rules agent 34 to apply detailed rules based on network topology, event conditions, and/or network device attributes, to obtain problems/resolution information from the troubleshooting databases 28, enabling the device 16a to be automatically evaluated with possible downloading of executable resources to resolve the problems associated with the encountered events to minimize disruption of service by the device 16.

Figure 5:
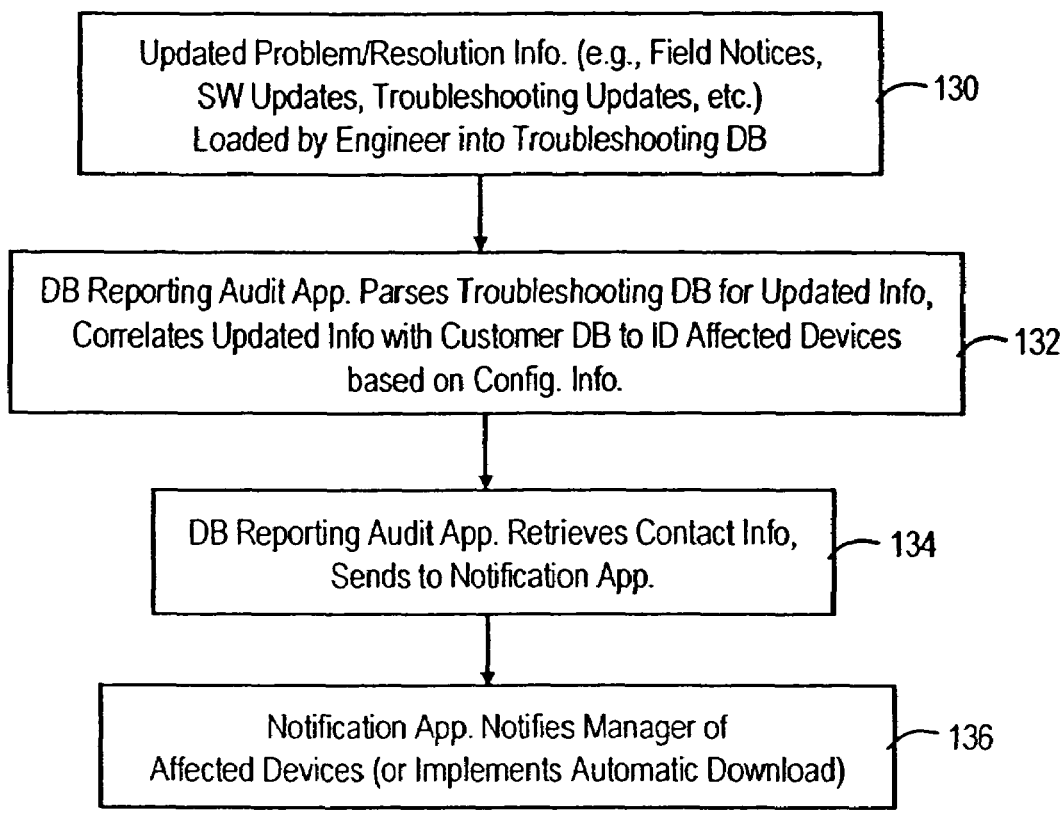
FIG. 5 is a flow diagram illustrating proactive notifications for a network device by the system of FIG. 1, according to an embodiment of the present invention.

FIG. 5 is a diagram illustrating a method for providing proactive notifications according to an embodiment of the present invention. The method begins in step 130, where a technical support or a customer support engineer will provide updated problems/resolution information into the troubleshooting databases 28a or 28b. In particular, each database entry for a given problem/resolution entry includes sufficient XML based identifier tags that specify the relevant attributes that can be used by the rules manager 34 or the reporting engine 36 in correlating the database for the resolution information; such tags may include network topology class, network device class, events class, monitored parameter class, configuration class, etc.

The database reporting audit application 36 periodically parses the troubleshooting database 28 in step 132 to locate the updated information relevant to the last performed correlation, and correlates the updated information with the customer database 26 to identify affected devices based on the stored configuration information in the customer database 26. The database reporting audit application 36, in response to identifying the affected devices, retrieves in step 134 the contact information from the customer contact database 52, and sends the customer contact information and respective information identifying the affected device and the updated resolution information. The notification application 38 notifies the manager of the affected devices about the updated problem/resolution information, enabling the network manager to review the updated problem resolution information and take any proactive information necessary to implement the updated problem/resolution information within the network device 16. Alternately, the notification application 38 implements in step 136 an automatic download of executable resources, for example the software updates, implemented as patches, plug-ins, or java applets, for automatic deployment by the trapplet 22.

According to the disclosed embodiment, fault detection and resolution for a network device can be fully automated, enabling technical engineering resources to be exploited in a scalable manner by loading the technical engineering information within troubleshooting databases that can be correlated by advanced correlation engines using structured schemas, and using an advanced correlation engine capable of applying structured rules for correlation of the technical databases. In addition, the disclosed embodiment integrates device specific information, including device configuration and network topology, with event specific attributes, to provide precise correlation parameters for the rules based correlation of the technical databases. The results of the correlation of the technical databases can be further automated by sending back to the local server executable resources configured for automatically implementing the technical resolution to the associated problem, as necessary.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A system comprising:
a network device having an identifiable configuration and including a monitoring agent configured for monitoring device operations relative to monitored parameters, the monitoring agent configured for generating a notification message based on an event where the device operations exceed at least one of the monitored parameters;
a troubleshooting resource configured for requesting selected device state attributes associated with the event from the network device based on reception of the notification message;
at least one data collection resource configured for collecting the selected device state attributes associated with the event into an event message, the at least one data collection resource configured for collecting the selected device state attributes for events from a respective plurality of the troubleshooting resources via respective secure connections via an Internet Protocol (IP) network,
a first database configured for storing identifiable configuration information for multiple network devices, including the identifiable configuration information describing the corresponding identifiable configuration for the network device, the identifiable configuration information for the network device including network topology information related to the network device;
a second database configured for storing problem/resolution information for the network device according to known configurations; and
a rules-based troubleshooting system configured for determining a presence in the second database of problem/resolution information for the network device based on correlating the identifiable configuration information retrieved from the first database and the corresponding selected device state attributes specified in the event message, the rules-based troubleshooting system configured for providing a service notification message as a response to the event and that selectively includes the problem/resolution information for the network device.

2. The system of claim 1, wherein the monitored parameters include CPU utilization, and memory usage.

3. The system of claim 2, further comprising a service appliance configured for executing the troubleshooting resource and establishing a secure tunnel connection with the network device for retrieval of the selected device state attributes from the network device.

4. The system of claim 2, wherein the network device is configured for local execution of the troubleshooting resource.

5. The system of claim 2, wherein the selected device state attributes include an identification of each process executed by the network device upon generation of the notification message, and memory resource utilization for each corresponding identified process.

6. The system of claim 1, further comprising a plurality of the data collection resources, each configured for receiving the selected device state attributes from a corresponding group of the troubleshooting resources via the IP network and based on a corresponding geographic region.

7. The system of claim 6, wherein the monitoring agent is configured for supplying, upon initialization, the identifiable configuration information to the corresponding one data collection resource via the corresponding secure connection for storage in the first database.

8. The system of claim 7, wherein the monitoring agent is configured for supplying updated identifiable configuration information to the corresponding one data collection resource for storage in the first database in response to detecting a change in the network device from the identifiable configuration information to the updated identifiable configuration information.

9. The system of claim 7, wherein the rules-based troubleshooting system includes:
a rules manager configured for correlating the second database for the problem/resolution information for the network device based on correlating the identifiable configuration information, and the selected device state attributes, relative to network management rules specified according to an extensible markup language, the network management rules including network infrastructure rules for describing a network infrastructure and network element rules for describing network elements, including the network device, within the corresponding network infrastructure;
a notification resource module configured for identifying a manager contact for the network device, the notification resource module configured for sending notification information, including the service notification message, to the manager contact; and
a central communications system configured for routing information between the at least one data collection resource, the first database, and the second database, the central communications system including:
(1) an inventory management resource configured for loading the identifiable configuration information for the network device, received from a first message via the corresponding data collection resource, into the first database according to a prescribed database format,
(2) a device troubleshooting resource configured for responding to the event message by fetching the identifiable configuration information for the network device associated with the event message, sending a query to the rules manager for correlation of the problem/resolution information, and sending results of the query to the notification resource module; and
(3) a message router configured for routing messages between the data collection resources, the inventory management resource, the notification resource module, the device troubleshooting resource, and the rules manager.

10. The system of claim 9, wherein the rules-based troubleshooting system further includes a device update resource configured for identifying, based on new problem/resolution information added to the second database, network devices affected by the new problem/resolution information based on correlating the new problem/resolution information to the respective identifiable information stored in the first database, the device update resource configured for outputting to the notification resource module an update notification for the network devices affected by the new problem/resolution information.

11. The system of claim 9, wherein the rules-based troubleshooting system further includes a best practices module configured for identifying optimum device configuration settings, the best practices module configured for outputting to the notification resource module a practice advisory message for the network device, based on correlating the corresponding identifiable configuration information with the stored problem/resolution information.

12. The system of claim 1, wherein the network device is implemented as a network router that executes the monitoring agent.

13. A method of managing a network device, the method comprising:
storing identifiable configuration information for the network device in a first database configured for storing the identifiable configuration information for multiple network devices, the identifiable configuration information for the network device including network topology information related to the network device;
generating, in the network device, a notification message based on an event where device operations monitored by a monitoring agent exceed at least one of a plurality of monitored parameters;
requesting, by a troubleshooting resource, selected device state attributes associated with the event from the device based on reception of the notification message;
collecting the selected device state attributes associated with the event from the troubleshooting resource by a data collection resource via a secure connection via an Internet Protocol (IP) network, and outputting an event message that includes the selected device state attributes to a rules-based troubleshooting system;
determining, by the rules-based troubleshooting system, a presence in a second database of problem/resolution information for the device based on correlating the identifiable configuration information retrieved from the first database and the corresponding selected device state attributes specified in the event message, the second database configured for storing problem/resolution information for the network devices according to respective known configurations; and
providing, by the rules-based troubleshooting system, a service notification message as a response to the event and that selectively includes the problem/resolution information for the device.

14. The method of claim 13, wherein the monitored parameters include CPU utilization, and memory usage.

15. The method of claim 14, further comprising establishing a secure tunnel connection between the troubleshooting resource and the network device for retrieval of the selected device state attributes from the network device.

16. The method of claim 14, wherein the network device is configured for local execution of the troubleshooting resource.

17. The method of claim 14, further comprising supplying by the monitoring agent the selected device state attributes, including an identification of each process executed by the network device upon generation of the notification message, and memory resource utilization for each corresponding identified process, to the troubleshooting resource.

18. The method of claim 13, further comprising supplying the selected device state attributes to the data collection resource selected from a plurality of the data collection resources, each said data collection resource configured for receiving the selected device state attributes from a corresponding group of the troubleshooting resources via the IP network and based on a corresponding geographic region.

19. The method of claim 18, wherein the storing step includes supplying, by the monitoring agent upon initialization, the identifiable configuration information to the corresponding one data collection resource via the corresponding secure connection for storage in the first database.

20. The method of claim 19, further comprising supplying, by the monitoring agent, updated identifiable configuration information to the corresponding one data collection resource for storage in the first database in response to detecting a change in the network device from the identifiable configuration information to the updated identifiable configuration information.

21. The method of claim 19, wherein:
the rules-based troubleshooting system includes a rules manager, a notification resource module, and a central communications system having an inventory management resource and a device troubleshooting resource, the central communications system configured for routing information between the at least one data collection resource, the first database, and the second database;
the determining step includes correlating the second database, by the rules manager, for the problem/resolution information for the network device based on correlating the identifiable configuration information, and the selected device state attributes, relative to network management rules specified according to an extensible markup language, the network management rules including network infrastructure rules for describing a network infrastructure and network element rules for describing network elements, including the network device, within the corresponding network infrastructure;
the providing step includes identifying, by the notification resource module, a manager contact for the network device and sending notification information, including the service notification message, to the manager contact;
the storing step includes loading the identifiable configuration information for the network device, received by the inventory management resource from a first message via the corresponding data collection resource, into the first database according to a prescribed database format; and
the determining step further includes responding, by the device troubleshooting resource, to the event message by fetching the identifiable configuration information for the network device associated with the event message, sending a query to the rules manager for correlation of the problem/resolution information, and sending results of the query to the notification resource module.

22. The system of claim 21, further comprising identifying optimum device configuration settings for the network device by outputting to the notification resource module a practice advisory message for the network device, based on correlating the corresponding identifiable configuration information with the stored problem/resolution information.

23. The method of claim 13, wherein the network device is implemented as a network router that executes the monitoring agent.

* * * * *